(12) United States Patent
Churchill et al.

(10) Patent No.: US 8,312,380 B2
(45) Date of Patent: Nov. 13, 2012

(54) LOCAL MAP CHAT

(75) Inventors: Elizabeth F. Churchill, San Francisco, CA (US); Elizabeth Goodman, San Francisco, CA (US); Joseph O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 854 days.

(21) Appl. No.: 12/098,326

(22) Filed: Apr. 4, 2008

(65) Prior Publication Data

US 2009/0254840 A1     Oct. 8, 2009

(51) Int. Cl.
G06F 3/14     (2006.01)
G06F 3/17     (2006.01)

(52) U.S. Cl. ............ 715/753; 715/738; 705/10; 705/14; 701/213; 379/265.01

(58) Field of Classification Search .......... 715/200–277, 715/700–867; 700/701–866; 709/201–229; 705/10, 50–79, 14; 345/30–111; 707/1–10, 707/100–104.1, 200–206; 701/213; 379/265.01
See application file for complete search history.

(56) References Cited

U.S. PATENT DOCUMENTS

| | | | |
|---|---|---|---|
| 2007/0192168 A1* | 8/2007 | Van Luchene | 705/10 |
| 2007/0288164 A1* | 12/2007 | Gordon et al. | 701/213 |
| 2008/0086368 A1* | 4/2008 | Bauman et al. | 705/14 |
| 2009/0041227 A1* | 2/2009 | Altberg et al. | 379/265.01 |
| 2009/0288012 A1* | 11/2009 | Hertel et al. | 715/738 |

OTHER PUBLICATIONS

CommunityWalk, retrieved online at <http://www.communitywalk.com/> date accessed on Apr. 25, 2008.
Geography 2.0: Virtual Globes, retrieved online at <http://geography2.blogspot.com/2006/03/conversations-with-maps.html> date accessed on Apr. 25, 2008.
GIS Planet: Geochat room, retrieved online at <http://gisplanet.blogspot.com/2007/10/geochat-room.html> date accessed on Apr. 25, 2008.

* cited by examiner

*Primary Examiner* — Ruay Ho
(74) *Attorney, Agent, or Firm* — Greenberg Traurig, LLP

(57) ABSTRACT

Information communication technology operable to provide users with a means for sharing information and comments is disclosed. The information communication technology provides a means for participants to place chat comments on an interactive graphic such as a dynamically rendered map that participants can track, edit and collaboratively work with in order to decide on a suitable meeting location.

29 Claims, 10 Drawing Sheets

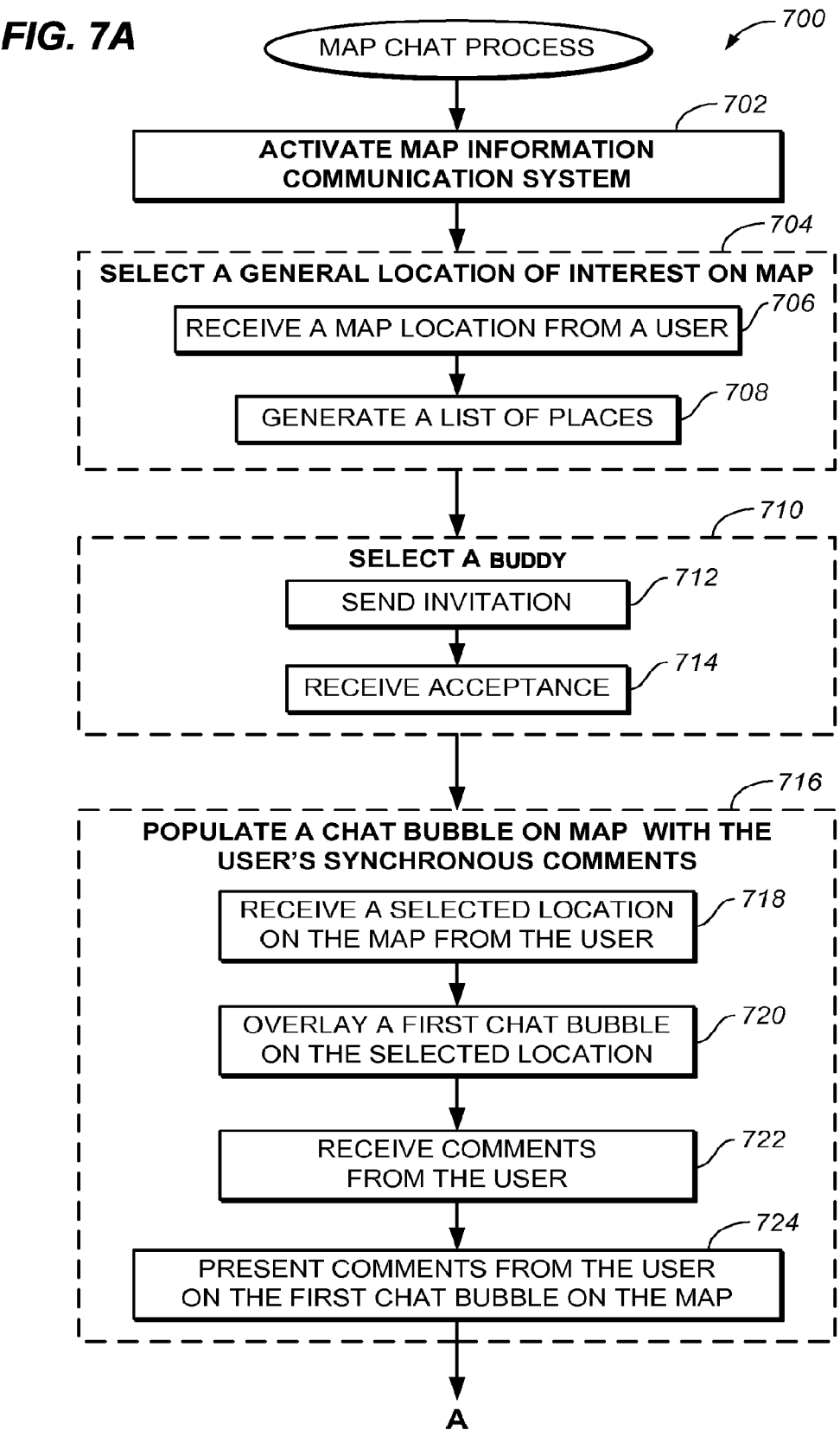

LOCAL MAP CHAT

FIELD OF THE INVENTION

The present invention relates generally to internet communication and more particularly to internet community communication.

BACKGROUND OF THE INVENTION

People setting up meetings and events often need to negotiate a meeting location. There are usually many issues to consider when making such an arrangement including local amenities, specific settings, nearby freeways, traffic, and personal preferences. If they do not have detailed knowledge of potential meeting and event locations, they may need to spend time exchanging resources such as maps and travel routes and suggestions over email or instant messaging.

Existing communication methods are not always adequate. For example, instant messaging applications are generally limited to text exchanges and explanations. Mapping mashups (a mashup is a web application that combines data from more than one source into a single integrated tool) exist, but are limited to static data from a database. Services for meeting with new people serendipitously have been offered by companies like Meetro, Dodgeball, and Loopt, but these operate through alerts and text notification services to mobile phones only when another user is near. Furthermore, previous work has been done on internet relay chat (IRC)—for example, for discussion during preparation of electronic documents. This work does not describe the dynamic integration of content from multiple sources; neither do actions taken in the chat log affect the underlying documents into which the IRC chat channels are placed. Previous work also describes a series of visualizations for email. Again, the underlying content (email messages) is not dynamically drawn from multiple disparate sources, and the interactivity on the map itself is not dynamic. As another example, "chat bubbles", are graphical bubbles around text associated with a visual object such as an avatar, but these are also not dynamically drawn from multiple sources. Furthermore, present applications do not locate instant-messenger conversations over any relevant dynamic, backdrop-content context.

The aforementioned services are of limited help for pre-arrangement of a meeting location. Currently, no application locates instant-messenger conversations within a relevant dynamic, backdrop-content context for arranging the details of rendezvous setting, group events and social meetings. Therefore, there is a need for systems and methods that provide help for arranging meetings dynamically.

SUMMARY OF THE INVENTION

Information communication technology operable to provide users with a means for sharing location relevant event (e.g. maps, routes, events, and place recommendations) information and comments is disclosed. The map and event planning information communication technology provides a means for participants to place chat comments on an interactive map that participants can edit and collaboratively work with in order to decide on a suitable meeting location. Embodiments of the invention, allow synchronous conversation (e.g., via text, voice, video, or sound) by providing multiple bubbles from different people to be available on a map simultaneously, thereby allowing meetings to be arranged dynamically.

A first embodiment comprises a map information communication system. The system comprises logic for providing an interactive graphic suitable for presentation on a webpage display, and receiving a first text string from a first user who is one of a plurality of users, wherein the first text string is associated with a first location on the interactive graphic. The system further comprises logic for providing the first text string from the first user to the interactive graphic for presentation on the interactive graphic at the first location on the interactive graphic with which the first text string is associated. The interactive graphic may comprise a map.

A second embodiment of the invention comprises a method for map information communication. The method comprises receiving a first text string from a first user who is one of a plurality of users, and receiving a first location on a graphic for the first text string from the first user. The method further comprises providing the first text string for presentation on an interface at the first location on the graphic.

A third embodiment of the invention comprises a computer-readable medium comprising program code for map information communication. The program code comprises receiving a first text string from a first user who is one of a plurality of users, and receiving a map location for the first text string from the first user. The program code further comprises providing the first text string for presentation on a webpage at a location on an interactive graphic in a relation to the map location.

A fourth embodiment of the invention comprises an interface for presentation on a webpage. The interface comprises an interactive graphic of an area of interest operable for presentation of conversational commentaries in relation to locations on the interactive graphic; and a plurality of commentary submission areas for input of the conversational commentaries.

Further features and advantages of the invention, as well as the structure and operation of various embodiments of the invention, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE EXEMPLARY EMBODIMENTS

Figure 1:
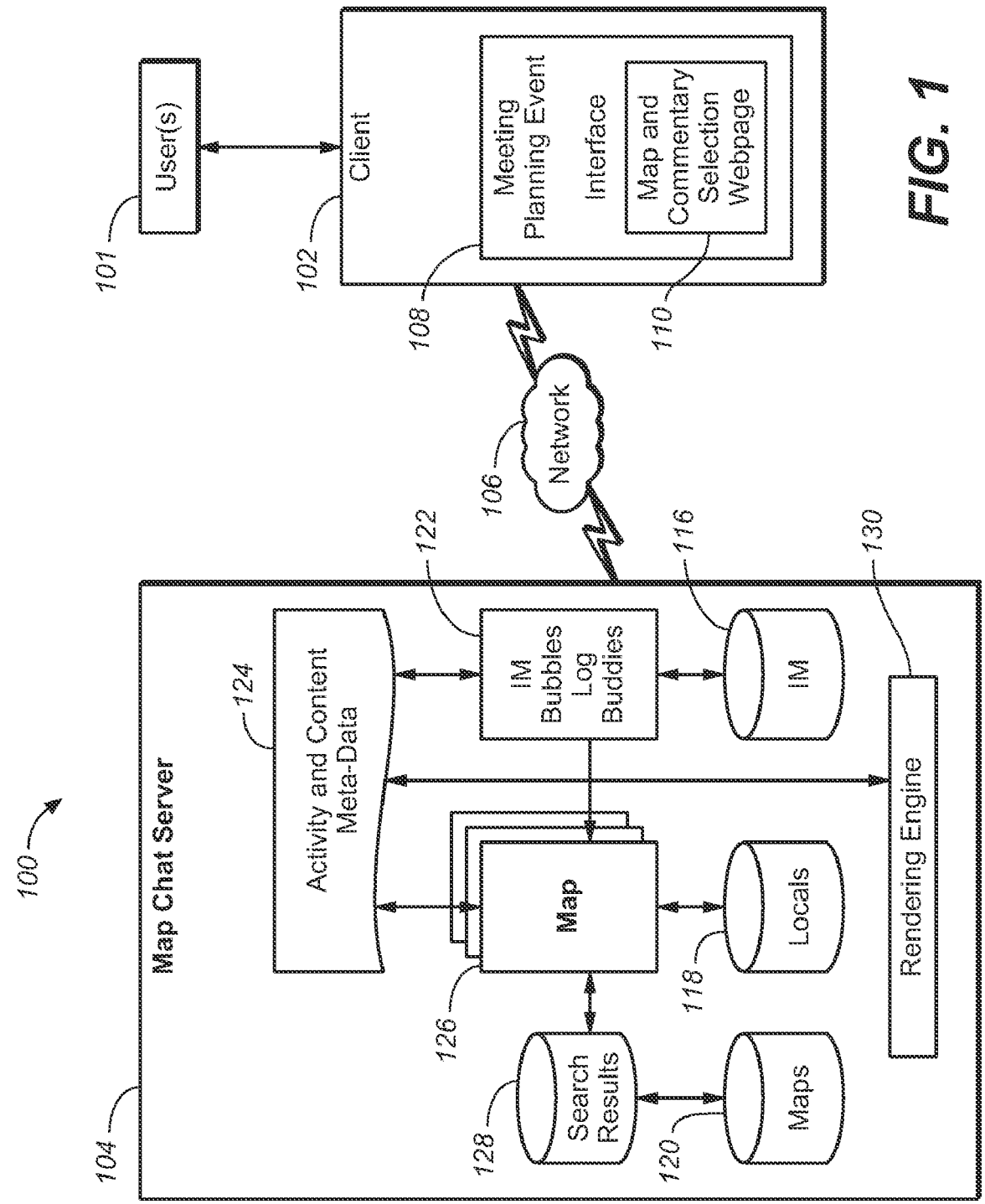
FIG. 1 is a block diagram illustrating an exemplary map information communication system in accordance with an embodiment of the invention.

In the following description of exemplary embodiments, reference is made to the accompanying drawings which form a part hereof, and in which it is shown by way of illustration specific embodiments in which the disclosure may be practiced. It is to be understood that other embodiments may be utilized and structural changes may be made without departing from the scope of the exemplary embodiments of the invention.

Embodiments of the invention allow participants to place chat comments on an interactive map that participants can edit and collaboratively work with in order to decide on a suitable meeting location. Furthermore, a feature of embodiments of the invention is the information sources from which the chat background is drawn (e.g., dynamic, zoom-able maps with targeted number arrows that link to the corresponding location listing). A further feature is the integration of content from a number of services, and a database of activity and resource selection to provide an asynchronous component to the decision making. Another feature is collaborative production of a meeting place using resources from multiple sources.

A specific content search problem that is solved according to embodiments of the invention is the reduction of effort on the part of the end-users by providing an automatic marshalling of relevant information from various sources into a "mash-up" like visualization. The visualization solves a communication problem by providing a way for people to achieve common ground in a synchronous conversation easily and interactively. Embodiments of the invention provide a framework upon which several commonly used products which are currently separate may be brought together. Specifically, a new integrated communication centered on a focused social interaction that was previously not well supported in the separate tools. Instant messaging and maps are tied together to create an interactive map upon which people post chat messages.

Other related forms of information from other products may also be included to enhance the discussion. For example, further integration can occur with content drawn from Locals and Traffic. In order to provide better support for groups larger than dyads or small groups of friends working synchronously, the embodiments of the invention support creation of an event instance with a map associated and others invited, and recommendations placed on the map asynchronously and selections made later.

The present disclosure is directed toward systems and methods for arranging meetings and events. Embodiments of the invention are described herein in the context of one practical application, namely, arranging a meeting for coffee. Embodiments of the invention, however, are not limited to such coffee meeting applications, and the methods described herein may also be utilized in other applications such as business, sports, or other social meetings. As would be apparent to one of ordinary skill in the art after reading this description, these are merely examples and the invention is not limited to operating in accordance with these examples.

FIG. 1 is a block diagram illustrating an exemplary map information communication system 100 in accordance with an embodiment of the invention. System 100 comprises a client 102, and a server 104. Generally, the client 102 (or a plurality of clients) may access the server 104 via a network 106. The server 104 and the client 102, according to embodiments of the invention, may include any one of various types of computer devices, having, for example, a processing unit, a memory (including a storage device), and a communication interface, as well as other conventional computer components (e.g., an input device, such as a keyboard and mouse, or an output device, such as a display). For example, the client 102 may comprise user devices such as a desktop computer, laptop computer, mobile device such as a mobile phone and a vehicle navigation device, a kiosk, web-enabled phone, smart phone, and the like.

The client 102 comprises a software module that may operate on various devices such as a mobile device such as a cell phone, a desktop computer webpage, overhead monitor, kiosk, or other devices with various forms of display. The client 102 may comprise an interface 108 which includes a map and commentary selection webpage or component 110. The interface 108 is operable to accept user input (via devices such as a mouse, keyboard, or stylus, or via touch screen, or via gestures such as when a user moves her/his mouse or stylus in a predefined way that indicates an input). The component 110 may also change content and/or actions at user specified predefined times. The user can access and manipulate a map and commentary selection webpage 110 as explained in more detail in context with FIGS. 2-4. The interface 108 may be presented by a server such as, for example, a website server. The interface 108 may be used by producers and consumers of the map commentary to use and operate the map information communication system 100.

The client 102 may communicate with the server 104 using suitable communication interfaces via the network 106, such as the Internet. The clients 102 and the server 104 may communicate, in part or in whole, via wireless or hardwired communications, such as an Ethernet, IEEE 802.11b wireless, or the like. Additionally, communication between the client 102 and the server 104 may include various servers such as a mail server, mobile server, and the like.

The server 104 may be programmed to format data, accessed from local or remote databases or other sources of data, for presentation to users 101 of the client 102, for example, in the formats discussed in detail below. The server 104 may utilize various web data interface techniques such as the Common Gateway Interface (CGI) protocol and associated applications (or "scripts"), Java™ "servlets", e.g., Java™ applications running on the server 104, or the like to present information and receive input from the client 102. The server 104 may be implemented as, for example, a computer program, and may include a web server module, e.g., Apache™ or the like. The server 104, although described herein in the singular, may actually comprise plural computers, programs, devices, backends, and the like, communicating (wired or wireless) and cooperating to perform the functions described herein.

The server 104 can be a centralized facility, or any or all of its various functions can be distributed across a plurality of facilities or locations in a geographically diverse manner. Further, the various functions described herein as attributable to map information communication can be distributed to and among the various facilities the server 104 services. Various elements of the server 104 may communicate in part or in whole via wireless or hardwired communications links, such as an Ethernet, IEEE 802.11b wireless, or the like. Server 104 may include: an instant message (IM) spooler 116 operable to provide instant messages from buddies, a local information database 118, a maps database 120, an instant message bubble generator 122 (buddy bubble), a meta-data generator 124, a map information page generator 126, a search results database 128, and a rendering engine 130.

The instant message spooler 116 is operable to provide instant messages from buddies. Buddies are users selected by a user to have access to maps selected by the user. The instant message spooler 116 is operable to receive instant messages from the buddies and transmit them to the instant message bubble generator 122 for viewing. The message may include text, voice, video, or sound data.

The local information database 118 stores information on, for example, shops, stores, restaurants, and other places where meetings may be held. The information may be locally stored or referenced from other services like yahoo.com, and thereby supporting a collaborative production of a meeting place using resources from multiple data sources.

The maps database 120 stores on-line maps that can be used by the user for reference and discussion with the buddies. The users can use the maps as shared visual spaces. The maps may be typographical, roadmaps, street maps, reference maps, satellite photos, documents, and the like.

The instant message bubble generator 122 receives instant messages from the instant message spooler 116, associates the messages with a map location, stores a log of the messages, and sends the messages to the meta-data generator 124 for preparation for presentation (by the rendering engine 130) as a chat bubble on the map at the map location. The instant message bubble generator 122 may also associate the chat bubble with an icon representing the buddy who sent the message. Users can save a chat session in the instant message bubble generator 122 and share it with others. This save function would happen automatically in chat sessions as users move from one map view to another (as explained in the context of discussion of FIG. 3B). Each new map view that presents either new results from a search or a chat would be auto saved for later retrieval during a chat session or once the user (initiator) had ended a session and then signed back in again to a chat session.

The map information page generator 126 can encapsulate map information with interaction display elements suitable for display on a map. For example, a map may be sourced from the maps database 120, which may store a variety of local, regional or other maps, and the map may be encapsulated in an interaction display element such as a box covering the entire area of the map and commentary selection webpage 110. For another example, a "text bubble" data structure may encapsulate map related discussion and data such as timestamps, communication identifiers, geo-position, and map identifiers. For a further example, local information from the locals database 118 such as a local restaurant may be encapsulated with search results 128 from the internet, such as numbers of stars from the Michelin Guide, user generated comments, or on-line traffic data for streets near the restaurant.

The meta-data generator 124 may encapsulate data from the instant message bubble generator 122 and map information page generator 126 into meta-data of map visible structures to show on a map. For example, bubbles, information about local events, local facilities, stores, businesses, places of interest, and the like may be prepared for presentation on the map by meta-data generator 124. The meta-data generator 124 can then send the meta-date to the rendering engine 130 for presentation.

The rendering engine 130 receives meta-data encapsulated and collated from the above sources 116/118/120/122/124/126/128 by the meta-data generator 124, and presents them on the interface 108 of client 102. The rendering engine 130 creates graphical representation on the map (e.g., any "map visible meta-data structure") that is then associated with the meta-data. The meta-data flows from the server 104 to the client 102 and from the client 102 to the sever 104 via the network 106. For example, the user interface 108 on the client 102 (e.g., on a user's device) communicates the user's interest in a location area to the server 104. The rendering engine 130 registers the selected map location selection(s) when the user activates or clicks on the map, and uses this meta-data to place a bubble which is populated with map discussion contents on the map. The map discussion content may include, without limitation, text, voice, video, or audio data. The audio and video conversations may be performed via video and audio streaming techniques. The rendering engine 130 is between the general data sources 116/118/120/122/124/126/128 and the client 102, and mediates the presentation of the meta-data. It thereby forms a filter on the general data sources to present only the currently relevant information in combination with the user's preferences and interests.

Figure 2:
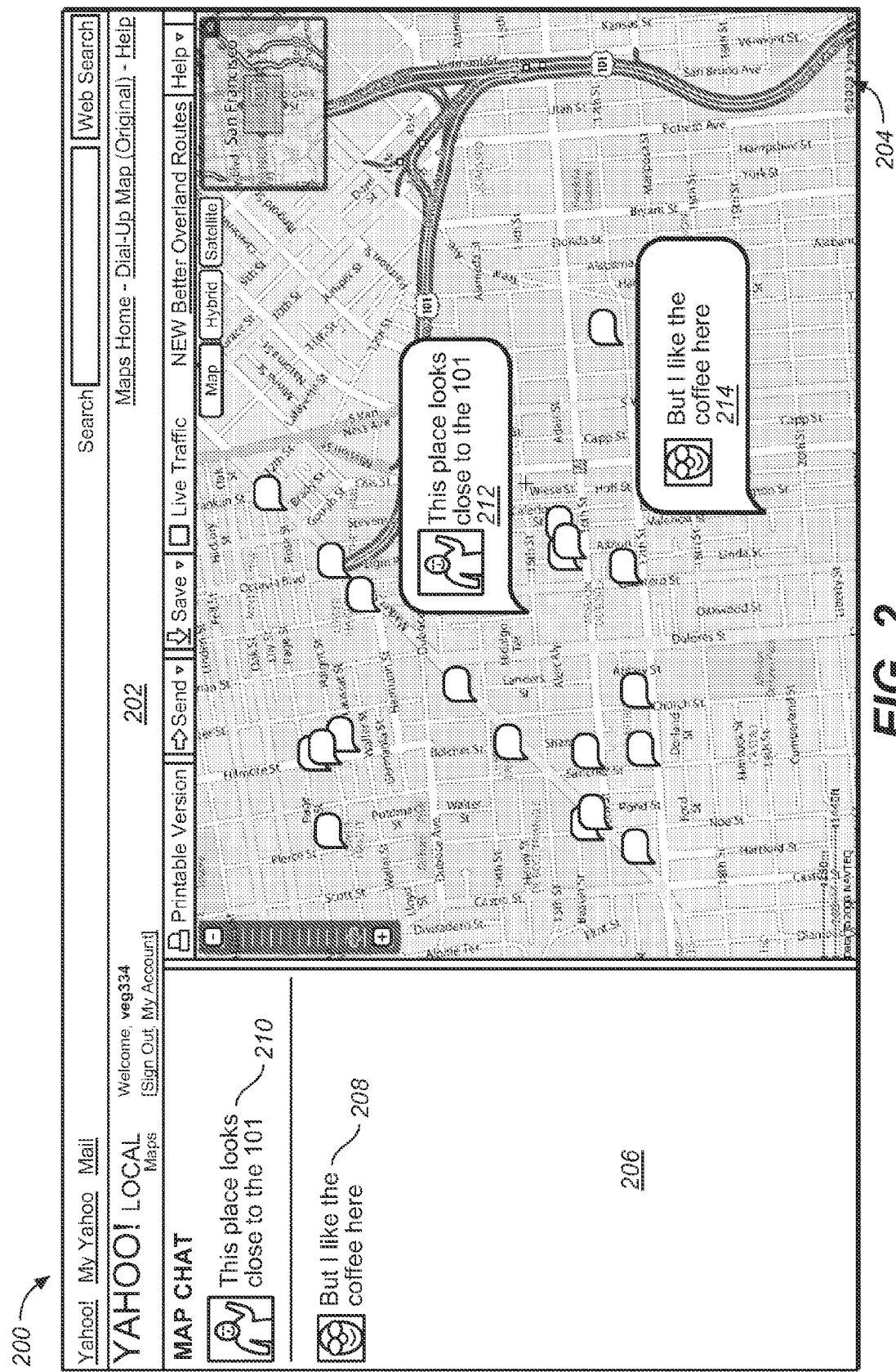
FIG. 2 is an illustration of an exemplary viewing webpage for map information communication according to an embodiment of the invention.

FIG. 2 is an illustration of an exemplary map information communication user interface 200 for social map information communication according to an embodiment of the invention. FIG. 2 shows an example webpage interface of a map information communication interface 200 that might appear on a display according to an embodiment of the invention. The interface 200 may include a product identity area 202, an interactive map display area 204, and a comment log area 206.

The product identity area 202 identifies the service provider (e.g., Yahoo!™). It may include a trademark or an explanation of services. The product identity area 202 may also identify the user, and provide other service options.

The interactive map display area 204 presents a map showing the location of the meeting place such as a restaurant or shopping center. The interactive map display area 204 may also show approach roads or alternative meeting locations. The interactive map display area 204 includes user and buddy chat bubbles (e.g., buddy chat bubble 212 and user chat bubble 214) as explained below. The interactive map may be dynamically rendered, and furthermore, may be dynamically rendered to show a map area that is under discussion.

The comment log area 206 (also referred as a chat log) lists the comments by the user and any buddies in a time sequential order, such as user comment 208 and buddy comment 210. The user comment 208 and buddy comment 210 duplicate at least a portion of the text included in the user chat bubble 214 and buddy chat bubble 212, respectively. The comment log area 206 appears on the map information communication interface 200 to give a sense of the progression of the conversation between the user and his/her buddies. The user chat bubble 214 is displayed on the interactive map display area 204 pointing to the location of interest on the map, as specified by the user. The user chat bubble 214 also includes a text bubble displaying the text entered by the user, which in this example is "But I like the coffee here". The buddy chat bubble 212 is also displayed on the interactive map display area 204, and in this example indicates the buddy's preference for the second location. The buddy chat bubble 212 also includes a text bubble displaying the text entered by the buddy, which in this example is "this place looks close to the 101".

The user and buddies may have the option of displaying subsets of the comments, such as all comments, the last 20 comments, and the like. Participants of the chat can select any comment listed in the comment log area 206. For example, by selecting an earlier comment, the map may zoom to the old conversational location, and the map may present the text bubbles with the earlier comments at the old conversational location. The users can then share the views as described in the context of discussion of FIG. 3B below.

Figure 3A:
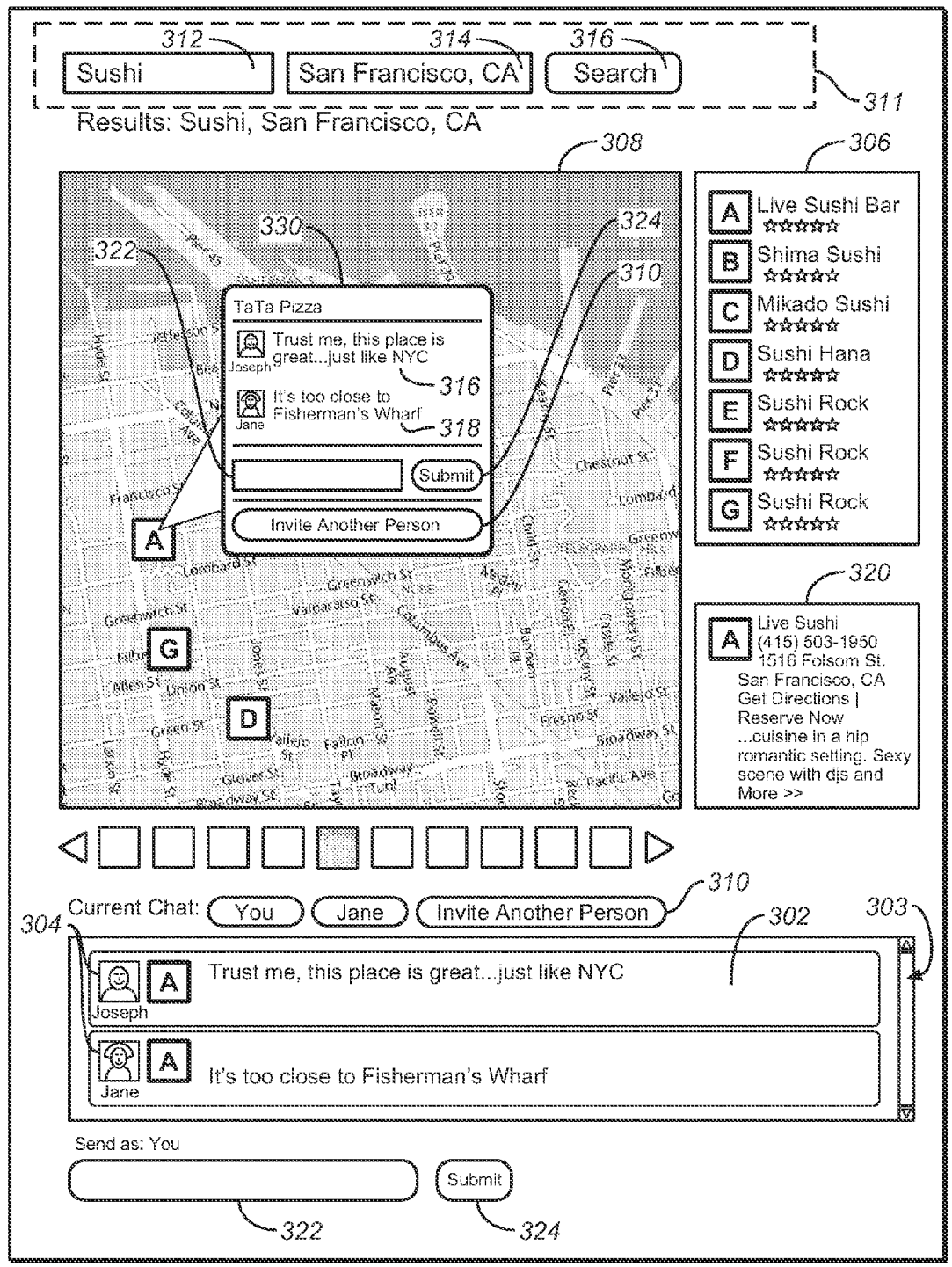
FIG. 3A is an illustration of an exemplary viewing webpage for map information communication system with buddy icons according to an embodiment of the invention.

FIG. 3A is an illustration of an exemplary map information communication interface 300, which shows how a map information communication interface might appear on a display of a client 102 device (e.g., a desktop computer, a laptop computer, a mobile device such as a mobile phone and a vehicle navigation device, a kiosk, a web-enabled phone, a smart phone, a TV, and the like) according to an embodiment of the invention. In the embodiment shown in FIG. 3A, a more complex embodiment of the same map information communication interface 200 (as shown in FIG. 2) is shown. Accordingly, similar features and operation of map information communication interface 200 will not be redundantly described herein. In the embodiment shown in FIG. 3A, the map information communication interface 300 may include a comments chat log area 302, a search results area 306 (reviews and recommendations area), an interactive map display area 308, an invite button 310, a search area 311, a detailed location information area 320, and a chat bubble 330.

The comments chat log area 302 includes a buddy icon list area 304 which includes visual representations (e.g., icons, photo images, or live videos) chosen by the user and buddies to represent themselves. The comments chat log area 302, presents chat logs/comments from users relative to a particular map location shown in the search results area 306. The search results area 306 provides additional information from the local information database 118 that may be referenced for deciding on a meeting location.

For example, Jane and Joseph are trying to find a place to meet some friends for coffee. They open up the map information communication interface 300 and select a general location. For example, in the search area 311 the search term "San Francisco, Calif." is entered into a search field 314 and a search is initiated by activating or clicking on the search button 316. Jane is not familiar with the city, but Joseph is. Jane types in "Sushi" in the search window 312 to search the local information database 118, and selects one of the possible locations shown in the search results area 306. For example, she can select a map location A by activating or clicking on the A icon. Once she selects the map location A, the map information communication interface 300 then highlights the map location A on the reviews section (e.g., search results area 306), displays the A icon on the interactive map display area 308, and displays more detail information about the map location A on the detail location information area 320. By activating or clicking on the A icon on the interactive map display area 308, the name of the map location A, for example, "Ta Ta Pizza" can appear on the chat bubble 330.

Joseph may then start typing in an open field 322 "Trust me, this place is great . . . just like NYC". Then Joseph can submit the text message that he has inserted in the open field 322 by activating or clicking on the submit button 324. Once Joseph submits his comments/text, an icon representing Joseph along with Joseph's comments can be presented on Joseph's comments area 316 on the chat bubble 330. Similarly, Jane can type a response for the same map location A on her map information communication interface 300 (on her client 102 device). For example, Jane can type "It's too close to Fisherman's Wharf". Once Jane submits her comments/text, an icon representing Jane along with her comments can be presented on the Jane's comment area 318 on the chat bubble 330. Both comments from areas 316 and 318 can also appear on the comments chat log area 302 to indicate what conversation is occurring on the interactive map display area 308.

Conversations are logged in the comments chat log area 302 and persistent so decisions and comments can be "replayed", and comments can be added as review meta-data to selected locations as explained in the context of FIG. 2 above. Moreover, while only two users discuss their plans in the above example, any number of users may use the system analogously. For example, Jane decides to ask Sally to join the meeting for coffee. The next day, Joseph, Jane, and Sally recall the previously completed and saved chat session to continue the conversation. When the discussion ends at a decision (e.g., a venue selected for an event), the conversation is again saved, and the event notice or invitation is created and distributed to the people involved in the communication.

Users can track a history of conversations. For example, Joseph and Jane may chat about map locations A-G as shown on the search results area 306, and can use the scroll bar 303 to scroll up and down in the comments chat log area 302 to see the chat history of the map locations A-G. In another embodiment, a user (Jane/Joseph) can click on a location icon (e.g., icon A) on the interactive map display area 308 to see a chat history of location A appear on the comments chat log area 302.

Users can invite other users (friends/buddies) to join a chat session. For example, in one embodiment, once Joseph and Jane have decided on a location, they can invite their selected buddies to the location, by activating or clicking on the invite button 310. In another embodiment, users can continue inviting friends or a group of friends to participate in the chat by activating or clicking on the invite button 310, thus leaving the map information communication interface 300 to be a further "place" for conversation. The map information communication interface 300 can invite friends/buddies by using the instant message (IM) spooler 116 of system 100 to provide instant messages in the form of invitations to the buddies.

In one embodiment, while friends are chatting about a location on the interactive map display area 308, a user or a plurality of users may want to temporarily navigate away from the current chat session to find other locations on the map and share other map view(s) with the friends.

Figure 3B:
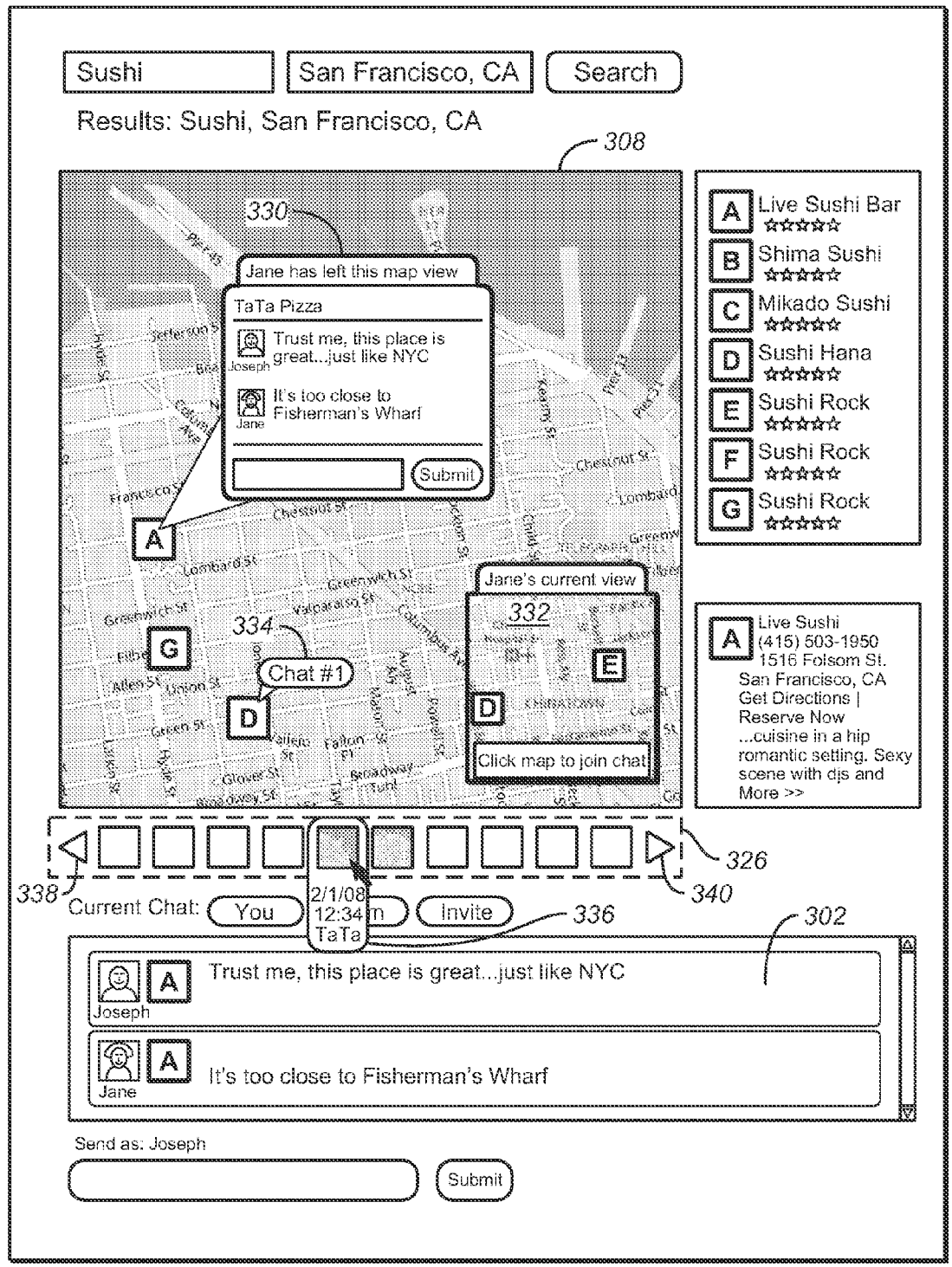
FIG. 3B is an illustration of an exemplary viewing webpage illustrating how users can share views on a viewing webpage.

FIG. 3B is an illustration of an exemplary viewing webpage illustrating how users can share views on a viewing webpage. FIG. 3B includes elements that are similar to FIG. 3A. Accordingly, the elements and operations of the embodiment shown in FIG. 3A will not be redundantly described herein. FIG. 3B, may include, a comments chat log area 302, an interactive map display area 308, a chat bubble 330, a new map view 332, a chat number 334, and a chat history area 326.

For sharing the views, a user can redraw an old location and if other users (buddies) accept the redrawing, then various map viewing is possible according to embodiments of the invention: (1) split or stacked panes, (2) zoomed out view with all locations and time stamps, or (3) page views, with one location per screen, but stacked like pages that can be turned through as snapshots in conversational/locational time. Alternatively, other views can be that of traditional television, picture in picture view, and the like.

During a chat session, the initial user and his/her buddy can navigate to different locations on the interactive map display area 308, or even off the interactive map display area 308 by zooming out to a map showing a larger or different area such as the new map view 332. For example, while Joseph (user)

and Jane (buddy) are chatting about the map location A, Jane may want to navigate away to find another map location. Jane may then start looking around for a new map location on her map information communication interface 300 on her client device 102. A live icon (not shown in FIG. 3B) may appear on the interactive map display area 308 indicating that Jane is searching for a new location. While Jane is searching for the new location, Joseph and Jane can continue logging comments on the comments chat log area 302, and view their comments.

If Jane finds a new location such as Chinatown, she activates or clicks on her interactive map display area presented on her client 102 device (not shown in FIG. 3B). In response to activating her interactive map display area, a new map view 332 (Jane's current view) may appear on the interactive map display area 308, and an icon D may also appear on the comments chat log area 302 (not shown in FIG. 3B). In this manner, both of these responses indicate to Joseph that Jane has found a new map location D. Additionally, system 100 sends a request to zoom to Joseph in the form of a dialog box. If Joseph accepts the zoom request, system 100 re-renders the new map view 332 for Joseph. Jane then begins typing and when done activates enter to handoff action, as explained below, to Joseph. Alternatively, if Joseph wants to select the new map location D, then he can either activate or click on the new map view 332 (Jane's current view), or activate/click on the icon D on the comments chat log area 302.

If Joseph, accepts the new map location D, system 100 then registers a new chat location on the interactive map display area 308 for the user (Joseph), fades the existing first chat bubble 330, creates a new chat bubble icon (not shown in FIG. 3B), and replaces interactive map display area 308 with the Jane's current view 332. Then system 100 on behalf of Jane sends a message to Joseph warning of the zoom to the new location off of their currently viewed pane of the interactive map display area 308.

If Joseph doesn't want to change his map view (e.g., interactive map display area 308), he can, for example, type a message to Jane in the comments chat log area 302 (as explained above in the context of discussion of FIG. 3A) saying "Jane where did you go? Why are you in Chinatown?". If Joseph denies the request to zoom, system 100 splits a map pane for Joseph and Jane, thereby rendering map illustrations of two locations, one for Joseph and one for Jane (not shown in FIG. 3B).

Alternatively, Joseph may also zoom the map out and find a new location as well. System 100 then sends a request to zoom to Jane in the form of a dialog box. If Jane accepts the new map location, system 100 registers a new location for Jane, fades the chat bubble 330, creates a new chat bubble in the new map location (not shown in FIG. 3B), and sends Jane a message warning of the zoom to the new map location off their (buddy and the user) currently viewed map pane. If Jane denies the request to zoom, system 100 splits a map pane for Joseph and Jane, thereby rendering map illustrations of two locations, one for Joseph and one for Jane (not shown in FIG. 3B).

Generally, a hand off action from one user to another is accomplished by clicking/activating "Enter" or "Return" after typing-in text for a chat bubble; activating or clicking (mouse up/down) on the map location; and/or activating or clicking (mouse up/down) on the list of recommended items. If two people are typing at the same time, timestamps may be used to show when the person clicks/activates Enter/Return. According to embodiments of the invention, each chat bubble 330 has a timestamp also, and there may be only one active chat bubble per person on the interactive map display area 204/308 at any given time. Clicking on the interactive map display area 204/308 will result in chat bubbles 212/214/330 appearing coded by color or icon to determine whose chat bubble it is. The icon/colors also should be reflected in the comment chat log area 206/302 so that a correspondence can be established. Selecting a location on the map that is associated with an item on the list of recommended items results in that item being selected and highlighted.

Users (Joseph and Jane) can view a chronological history of the chat(s) for each location. In one embodiment, for example, users can click or activate the chat number 334 of the location icons such as the icon D on the interactive map display area 308 to see a chat history related to Chinatown. In another embodiment, users can view a chronological history of the chats related to a map location by clicking on any of the icons in the chat history area 326. For example, users can activate or click on a chat history icon 336 to see a chat history as related to location A (TaTa Pizza). Users can also scroll to the left and to the right of the chat history area 326 by activating or clicking on buttons 338/340 respectively to see more chat history icons. The chat history, may include, without limitation, time sequence of the chats, history of locations as map view changes, names or identity of user and buddies (who is chatting) from instant message (IM) spooler 116 of system 100, and the like.

Figure 4B:
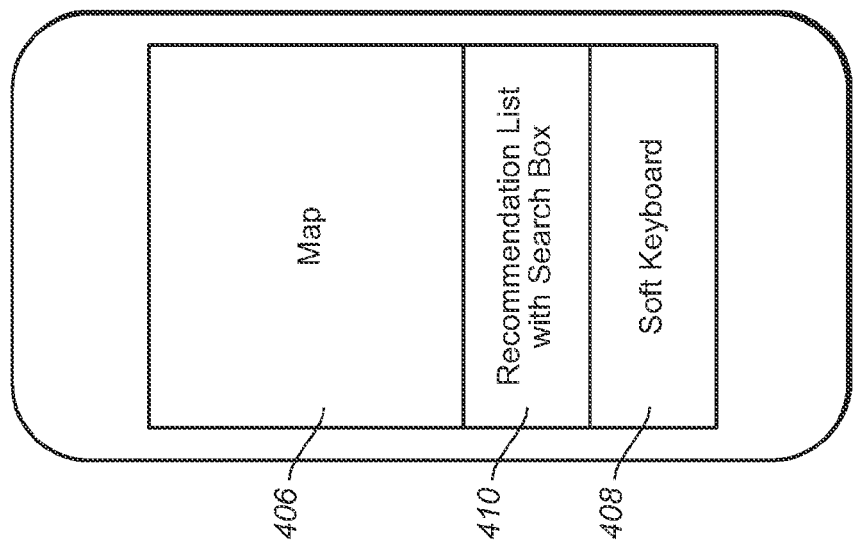
FIGS. 4A-4B illustrate exemplary interfaces for operation with touch screen mobile devices.
Figure 4A:
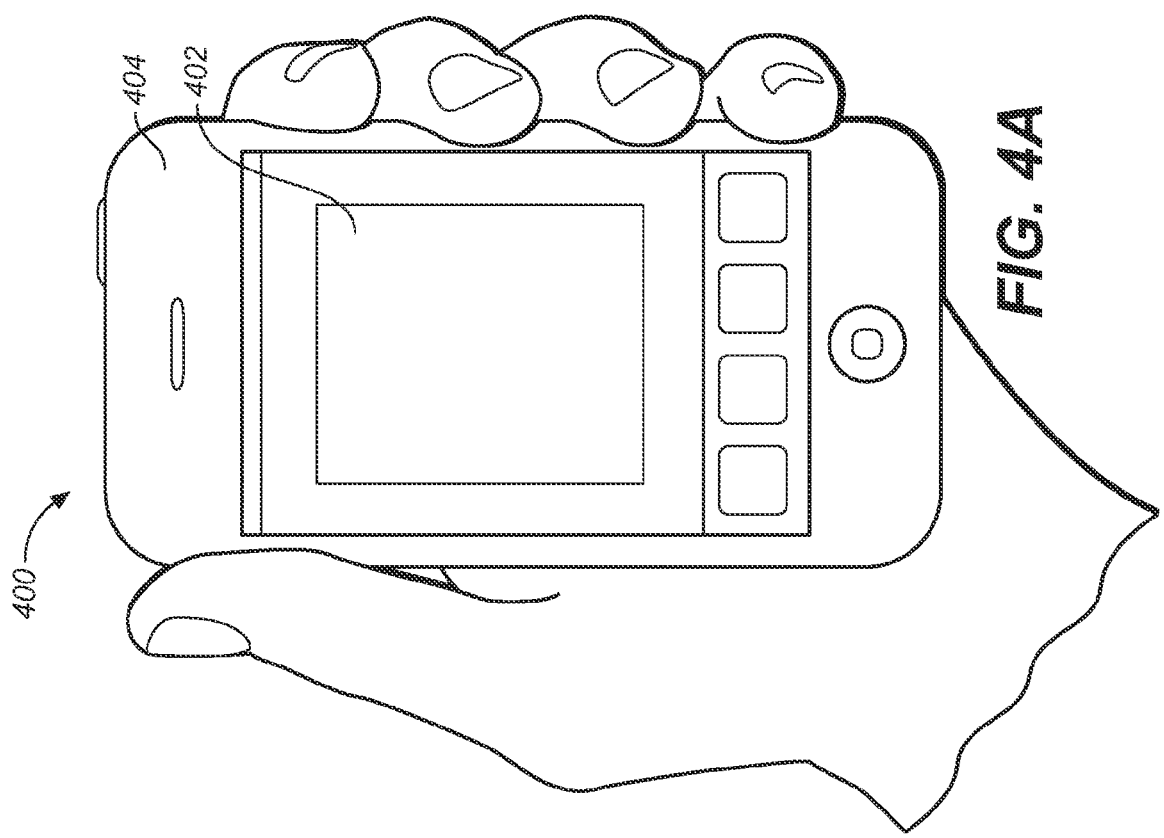

FIGS. 4A-4B illustrate exemplary interfaces for operation with touch screen mobile devices. FIG. 4A shows a webpage interface 402 on a cell phone 404 that can be used for operating the map information communication system 400. According to an embodiment of the invention shown in FIG. 4B, webpage interface 402 (see FIG. 4A) includes an interactive map 406, a soft keyboard 408, and a recommendation list with search box 410. The user can enter her/his data using the soft keyboard 408, by tapping keys on the keyboard display (not shown in FIG. 4), usually with a stylus. The user can use the recommendation list with search box 410 as explained above (see reference number 306 in FIG. 3A) to search through the local information database 118, and to find locals' recommendations for a particular place of interest.

Each of systems 100 and 400 unifies the subject of discussion—a dynamic representation of physical space—with the discussion itself. Unifying these pieces of information saves discussion participants effort in relating their discussions to separate sets of content. For a notable example, the spatial representation with the map as the consistent backdrop to all the interactions. Further, addition of locale-based information (café, restaurant, movies) offers opportunities for presenting users and buddies with options that are relevant to the place under discussion to further seed the conversation, and support the collaborative selection of activities. This offers an advantage to advertisers as well as the users and buddies. A mobile smart phone version of this application may use chat over a map to allow better use of the limited space that is available.

Figure 5:
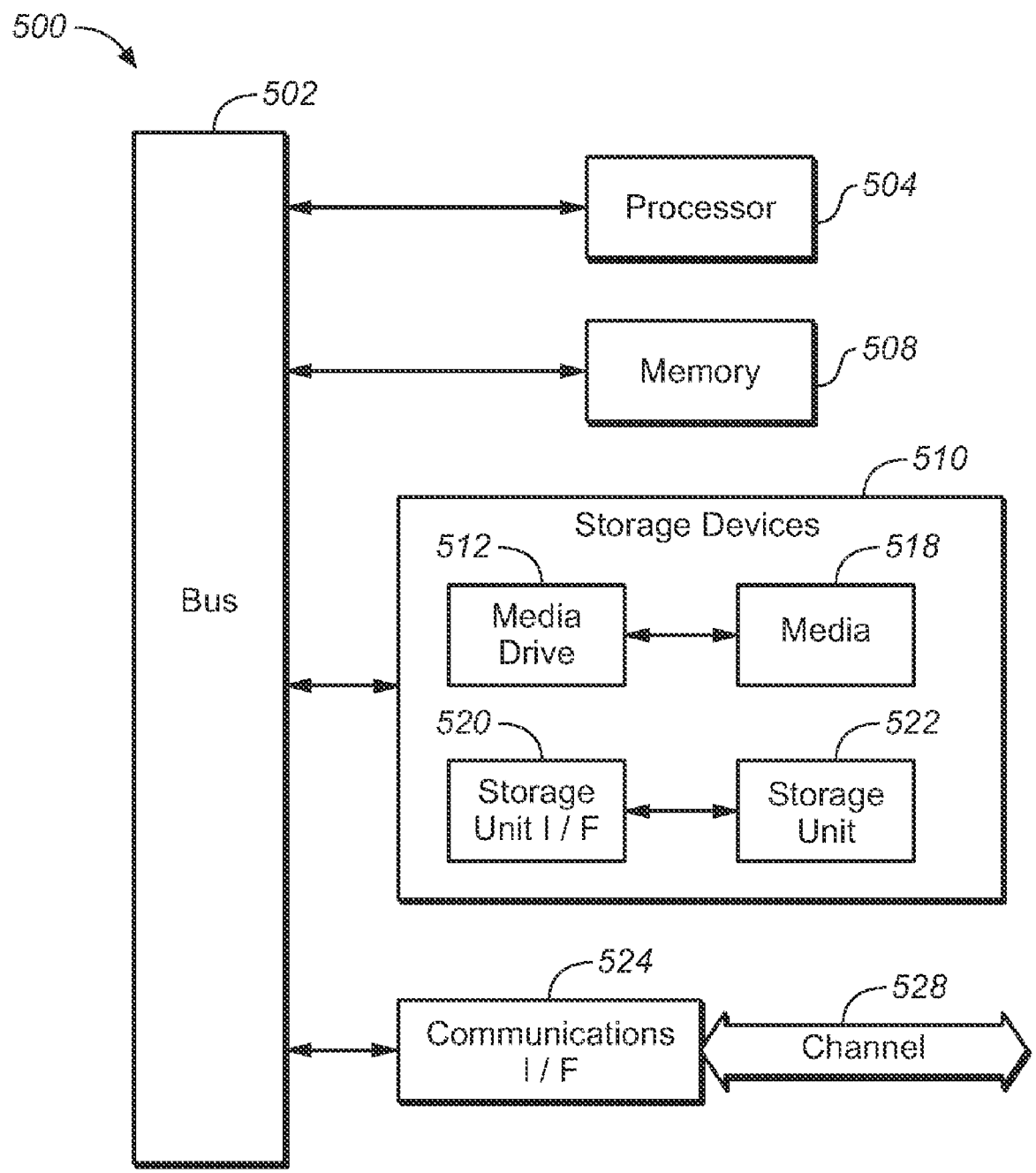
FIG. 5 is block diagram illustrating an exemplary computer system that may be used in accordance with some embodiments of the invention.

FIG. 5 illustrates a typical computing system 500 that may be employed to implement processing functionality in embodiments of the invention. For example, computing systems of this type may be used in clients and servers. Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504.

Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 512. As these examples illustrate, the storage media 518 may include a computer-readable storage medium having stored therein particular computer software or data.

In alternative embodiments, information storage devices 510 may include other similar components for allowing computer programs or other instructions or data to be loaded into computing system 500. Such components may include, for example, a removable storage unit 522 and a storage unit interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels 528 to perform features or functions of embodiments of the invention. Note that the code may directly cause the processor to perform specified operations, be compiled to do so, and/or be combined with other software, hardware, and/or firmware elements (e.g., libraries for performing standard functions) to do so.

Figure 6:
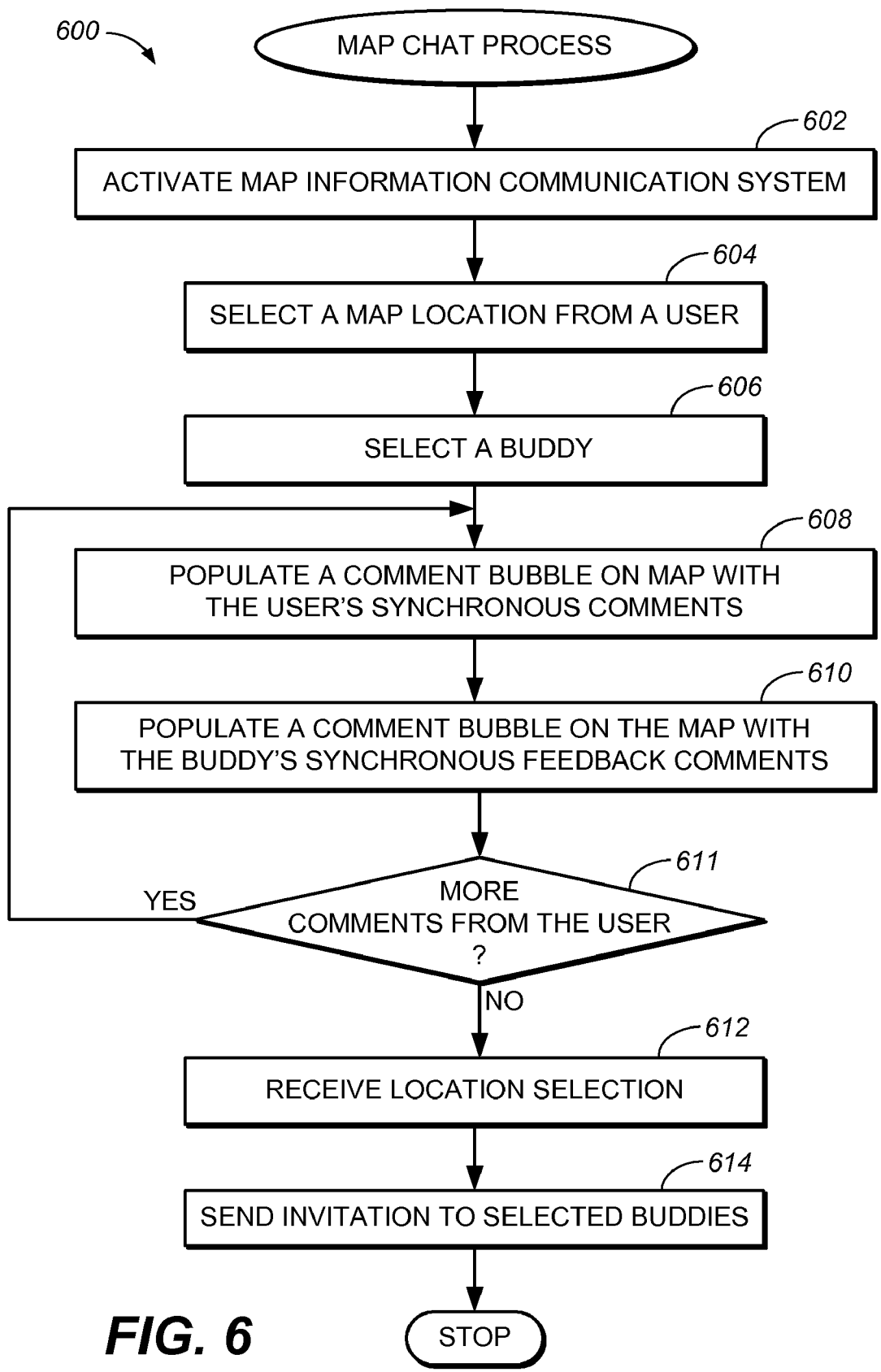
FIG. 6 shows an exemplary flow diagram illustrating a map information communication process in accordance with an embodiment of the invention.
Figure 7:
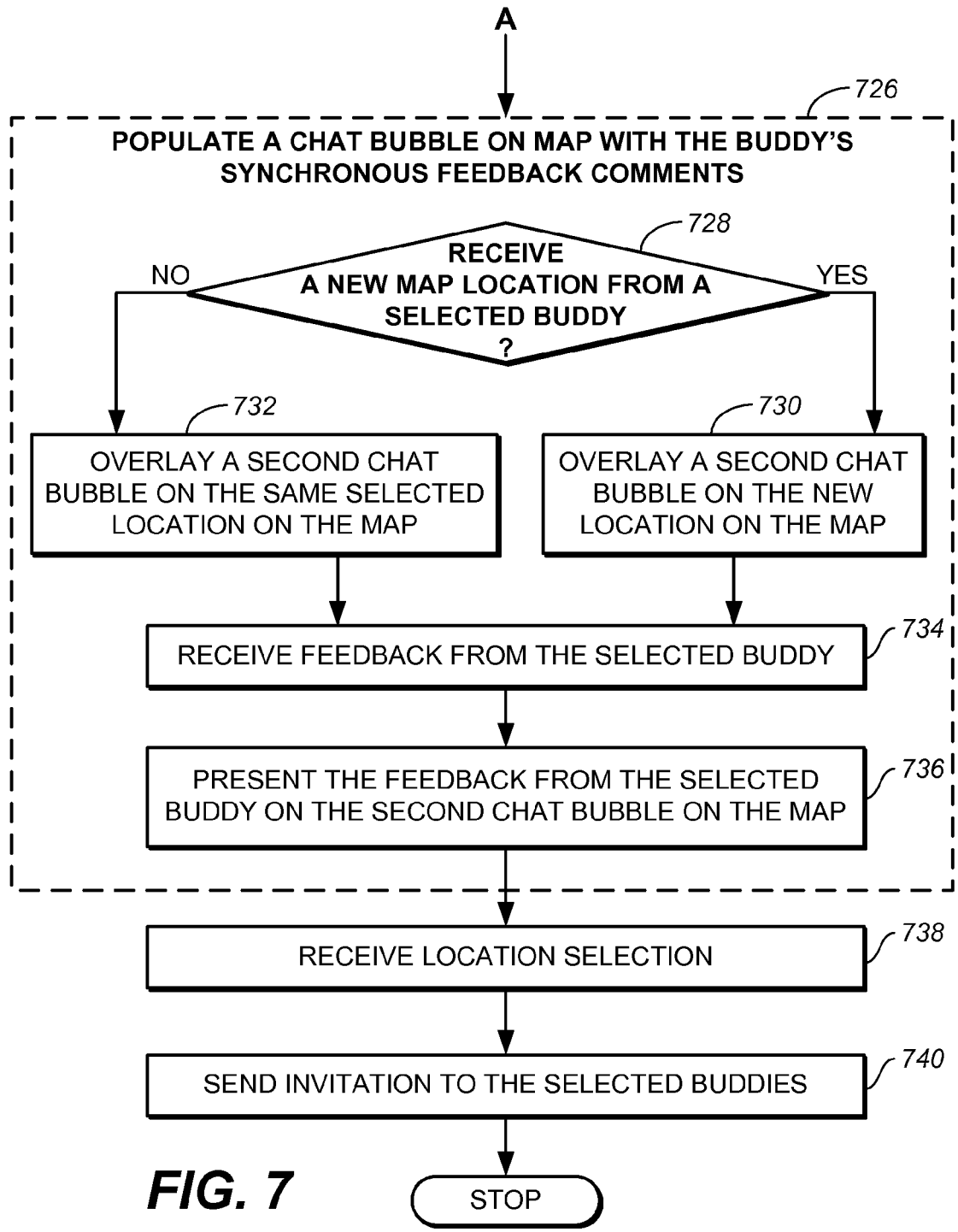
FIGS. 7A and 7B show exemplary flow diagram illustrating a map information communication process in accordance with an embodiment of the invention.

FIGS. 6-7 show exemplary flow diagrams illustrating map information communication processes 600-700 according to embodiments of the invention. The various tasks performed in connection with processes 600-700 may be performed by software, hardware, firmware, a computer-readable medium having computer executable instructions for performing the process method, or any combination thereof. It should be appreciated that processes 600-700 may include any number of additional or alternative tasks. The tasks shown in FIGS. 6-7 need not be performed in the illustrated order, and processes 600-700 may be incorporated into a more comprehensive procedure or process having additional functionality not described in detail herein. For illustrative purposes, the following description of processes 600-700 may refer to elements mentioned above in connection with FIGS. 1-5. In various embodiments, portions of processes 600-700 may be performed by different elements of systems 100-500, e.g., an interface, instant message spooler, local information database, map database, instant message bubble generator, meta-data generator, map information page generator, map database, and location database.

FIG. 6 shows an exemplary flow diagram illustrating map information communication process 600 according to an embodiment of the invention. The map information communication process 600 may begin by a user activating a map information communication system (task 602). For example, two users are looking for a place to have coffee, and neither of them is familiar with the area. The map information communication process 600 may then continue with a user deciding on an initial location for discussion, and the map information communication process 600 receiving a map location from the user (task 604). To receive comments on selected places to have coffee, the user selects a buddy (task 606). Next, the user specifies a location of interest on the displayed map and enters text relating to the selected location to populate a chat comment bubble pointing to the selected location (task 608). Completion of text entry by the user starts the hand off process to his buddy as explained in the context of FIG. 2 above. Process 600 may then receive a feedback from the selected buddy and populate a chat comment bubble with the feedback comment from the selected buddy (task 610).

If the user has more comments 611 in response to the feedback from the buddy, then process 600 leads back to task 608, otherwise the users decide on a location. Once the users decide on a location, they can invite their selected buddies to the location. The map information communication process 600 receives the location selection (task 612), and sends an invitation to selected buddies (task 614), leaving the map to be a further "place" for conversation. The conversations are logged, as explained above in the context of FIG. 3, and persistent so decisions and comments can be "replayed". The comments can be added as review meta-data to selected locations.

Figure 7B:
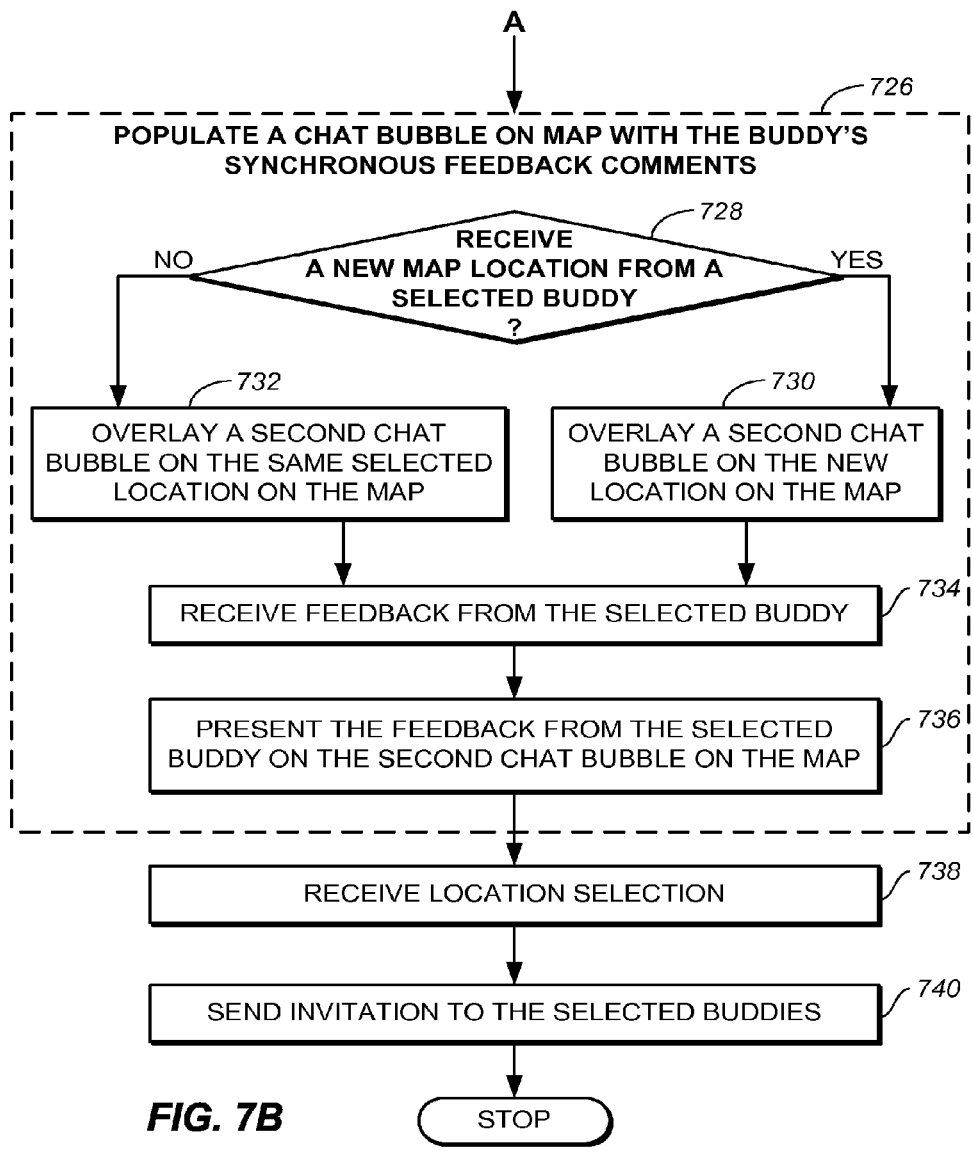

FIGS. 7A and 7B are views showing exemplary flow diagram illustrating the map information communication process 700 in more detail than process 600 according to an embodiment of the invention. FIGS. 7A and 7B include steps that are similar to the process 600. Accordingly, the process and operations of the embodiment shown in FIG. 6 will not be redundantly described herein.

Process 700 may start by activating the map information communication system (task 702) and selecting a general location of interest on the map (task 704, also see task 604 in FIG. 6 above). Selecting the general location of interest on the map comprises receiving a map location from a user (task 706), and generating a list of alternative places on the map (task 708). For example, a first user ("user" in FIG. 7A) enters a query such as "San Francisco coffee house 3rd market." In response based on the location "San Francisco 3rd market", a map is generated by the map server 126 using the maps 120 database, and a list of coffee houses at the corner of 3rd avenue and Market street is generated by the map server 126 using the locals 118 database.

Process 700 then selects a second user ("buddy" in FIG. 7A) (task 710, also see task 606 in FIG. 6). Selecting a second user comprises sending an invitation to a selected second user (buddy) (task 712), and receiving an acceptance from the selected second user (buddy) (task 714). For example, the first user (user) selects a friend(s) from a list of friends and/or enters an instant messaging (IM) address for a new chat buddy, and then activates or clicks on each buddy icon (e.g., buddy icon list area 304) to select additional buddies for the chat session (alternatively the names of buddies may be typed-in). Process 700 then sends invitations to selected friend(s) using instant messaging chat protocol, and the second user (buddy) may accept the invitation by activating or clicking on an URL link or a "Yes" button. Any standard activation technique such as that for instant messenger or the like can be used to receive and accept the invitation. These standard activation techniques are well known to those skilled in the art, and the general features of such techniques need not be described herein.

Process 700 then populates a chat bubble on the map with comments from the first user (user) (task 716, also see task 608 in FIG. 6). Process 700 receives a location on a map selected by the first user (user) (task 718). Receiving a location on a map selected by the first user comprises the first user (user) clicking on a location on the map, and process 700 registering an interface event (the click(s)) and generating a location code. Process 700 then overlays (augments) a chat bubble on the selected location (task 720) based on the location code. The chat bubble may include a first user (user) identifier icon. Process 700 then receives comments from the first user (user) (task 722), and presents the comments from the first user (user) on the chat bubble on the map (task 724). For example, a first user (user) clicks on a text entry field (when the user clicks on a location on the map a chat bubble appears and text can be entered into the text bubble, the user indication that he/she can type is that the cursor changes from a pointer to a carat) which initiates and streams bubble animation for the first user (user) overlaid on a map at the registered (selected) map location. The first user (user) then types text on the chat bubble, activates enter, and process 700 populates the text into the chat bubble on the map.

Process 700 may then receive synchronous feedback comments from the second user (buddy) (task 726, also see task 610 in FIG. 6). Process 700 determines whether the second user (buddy) has selected a new location on the map or intends to comment on the same location on the map that was already selected by the first user (user) (inquiry task 728). If process 700 determines that a new location is selected by the second user (buddy) (Yes branch of inquiry task 728), then a second chat bubble icon is overlaid at the new location (task 730) for presenting the second user's (buddy's) comments on the map. Overlaying the second chat bubble icon at the new location comprises the second user (buddy) clicking on another map location, process 700 registers the second user's (buddy's) click event, registers location meta-data, and generates a second chat bubble icon on the new selected location. Otherwise (No branch of inquiry task 728), process 700 overlays a second chat bubble icon at or near the same location previously selected by the first user (user) on the map (task 732). In either case, process 700 may then receive a feedback comment from the second user (buddy) (task 734), and present the comments from the second user (buddy) on the second chat bubble (task 736).

For example, after task 724, process 700 may hand off (as explained above) the map chatting to the second user (buddy) client interface. Handing-off the map chatting to the second user client interface comprises rendering a map and recommendation list, and opening an instant messaging chat entry box and log. The second user (buddy) reviews the location and chat text entered by the first user (user), and replies, for example, by typing a reply text. Process 700 then generates a bubble for the second user (buddy), second user (buddy) hits enter, and process 700 places text in instant messaging text log and in the chat bubble icon of second user (buddy).

The first and second users may continue choosing new map locations and engaging in the chat session (not shown in FIG. 7), as explained above in the context of FIG. 3, until they choose their final location. Process 700 then receives location selection (task 738, also see task 612 in FIG. 6), and sends an invitation to selected buddies (task 740, also see task 614 in FIG. 6).

Although embodiments of the invention are described herein in terms of map information communication, it should be understood that the present disclosure is not limited to map information communication, but is generally applicable to community communication. The embodiments of the invention are not limited to maps, they may apply to, for example, digital photographs, spreadsheet, and the like. Furthermore, although the present disclosure has been fully described in connection with embodiments thereof with reference to the accompanying drawings, it is to be noted that various changes and modifications will become apparent to those skilled in the art. Such changes and modifications are to be understood as being included within the scope of the present disclosure as defined by the appended claims.

While various embodiments of the invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skilled in the art, two or more modules may be combined to form a single module that performs the associated functions according embodiments of the invention.

In this document, the terms "computer program product", "computer-readable medium", and the like may be used generally to refer to media such as, for example, memory 508, storage devices 510, or storage unit 522. These and other forms of computer-readable media may be involved in storing one or more instructions for use by processor 504 to cause the processor 504 to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all operable in a common package. Indeed, any or all of the various components of a module, whether control logic or other components, can be combined in a single package or separately maintained and can further be distributed across multiple locations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A non-transitory computer-readable storage medium for tangibly storing thereon computer readable instructions for a processor to generate an interface comprising:
   an interactive map of an area of interest;
   at least one conversational commentary submission area generated at selected locations on the interactive map; and
   the at least one conversational commentary submission area receiving user text input of the conversational commentaries, each respective conversational commentary submission area of the at least one conversation commentary submission area being visually associated with a respective one of the selected locations on the interactive map and supporting a synchronous communication session between a respective two users of a plurality of users.

2. The non-transitory computer-readable storage medium of claim 1, further comprising computer readable instructions for a recommendation area for presenting reviews.

3. The non-transitory computer-readable storage medium of claim 1, further comprising, instructions to render an invite button operable to invite one user from the plurality of users to participate in the conversational commentaries.

4. The non-transitory computer-readable storage medium of claim 1, further comprising, instructions to render a user icon area for presenting a list of the plurality of users.

5. The non-transitory computer-readable storage medium of claim 1, further comprising, instructions to render a chat log area for presenting a list of commentaries received from the first user and the second user in the relation to locations on the interactive map.

6. The non-transitory computer-readable storage medium of claim 5, wherein the list of commentaries is operable to be viewed by a user.

7. The non-transitory computer-readable storage medium of claim 6, wherein the list of commentaries comprise commentaries pertaining to a plurality views of the interactive map.

8. The non-transitory computer-readable storage medium of claim 1, wherein the interactive map is dynamically rendered.

9. The non-transitory computer-readable storage medium of claim 1, wherein the conversational commentaries comprise video data.

10. The non-transitory computer-readable storage medium of claim 1, wherein the conversational commentaries comprise audio data.

11. The non-transitory computer-readable storage medium of claim 1, wherein the conversational commentaries comprise text data.

12. A method comprising:
receiving, by a computing device, a query relating to a map from a first user device associated with a first user;
generating, by the computing device, a list of locations on the map that relate to the query;
receiving, by the computing device, an indication that the first user has selected a second user for synchronous communication via the first user device;
sending, by the computing device, an invitation to a second user device associated with the second user to initiate the synchronous communication session between the first user device and the second user device;
receiving, by the computing device, an acceptance of the invitation from the second user device;
receiving, by the computing device, a selection of a first one location of the list of locations from the first user device;
creating, by the computing device, a synchronous communication session between the first user device and the second user device, where the first user device and the second user device each are caused to display the map, the list of locations and a first chat bubble on the map visually associated with the first one location of the list of locations, the first chat bubble supporting the synchronous exchange of messages between the first user device and the second user device.

13. The method of claim 12 additionally comprising:
receiving, by the computing device, a selection of a second one location of the list of locations from the second user device; and
causing, by the computing device, the first user device and the second user device to display the map, the list of locations and a second chat bubble in association with the second one location of the list of locations, the chat bubble supporting the synchronous exchange of messages between the first user device and the second user device.

14. The method of claim 13 additionally comprising:
receiving, by the computing device, via the synchronous communication session, a first plurality of comments from the first user device and the second user device relating to the first one location of the list of locations;
causing, by the computing device, each comment of the first plurality of comments to be displayed in the first chat bubble;
receiving, by the computing device, via the synchronous communication session, a plurality of comments from the first user device and the second user device relating to the second one location of the list of locations; and
causing, by the computing device, each comment of the second plurality of comments to be displayed in the second chat bubble.

15. The method of claim 14 wherein the first plurality of comments is saved to a database when the second chat bubble is displayed.

16. The method of claim 12 additionally comprising:
sending, by the computing device, invitations to each user of a plurality of third users to join the first user and the second user at the first one location of the list of locations.

17. The method of claim 12 wherein the list of locations on the map that relate to the query are retrieved from a database comprising recommendations from local users.

18. Non-transitory computer readable storage media for tangibly storing thereon computer readable instructions for a method comprising:
receiving a query relating to a map from a first user device associated with a first user;
generating a list of locations on the map that relate to the query;
receiving via the first user device, an indication that the first user has selected a second user for synchronous communication;
sending an invitation to a second user device associated with the second user to initiate the synchronous communication session between the first user device and the second user device;
receiving an acceptance of the invitation from the second user device;
receiving a selection of a first one location of the list of locations from the first user device;
creating a synchronous communication session between the first user device and the second user device, where the first user device and the second user device each are caused to display the map, the list of locations and a first chat bubble on the map visually associated with the first one location of the list of locations, the first chat bubble supporting the synchronous exchange of messages between the first user device and the second user device.

19. The non-transitory computer readable storage media of claim 18 additionally comprising:
receiving a selection of a second one location of the list of locations from the second user device; and
causing the first user device and the second user device to display the map, the list of locations and a second chat bubble in association with the second one location of the list of locations, the chat bubble supporting the synchronous exchange of messages between the first user device and the second user device.

20. The non-transitory computer readable storage media of claim 19 additionally comprising:
receiving via the synchronous communication session, a first plurality of comments from the first user device and the second user device relating to the first one location of the list of locations;
causing each comment of the first plurality of comments to be displayed in the first chat bubble;
receiving via the synchronous communication session, a plurality of comments from the first user device and the second user device relating to the second one location of the list of locations; and
causing each comment of the second plurality of comments to be displayed in the second chat bubble.

21. The non-transitory computer readable storage media of claim 20 wherein the first plurality of comments is saved to a database when the second chat bubble is displayed.

22. The non-transitory computer readable storage media of claim 18 additionally comprising:
sending invitations to each user of a plurality of third users to join the first user and the second user at the first one location of the list of locations.

23. The non-transitory computer readable storage media of claim 18 wherein the list of locations on the map that relate to the query are retrieved from a database comprising recommendations from local users.

24. A computing device comprising:
processor;
a storage medium for tangibly storing thereon program logic for execution by the processor, the program logic comprising:
logic executed by the processor for receiving a query relating to a map from a first user device associated with a first user;

logic executed by the processor for generating a list of locations on the map that relate to the query;

logic executed by the processor for receiving via the first user device, an indication that the first user has selected a second user for synchronous communication;

logic executed by the processor for sending an invitation to a second user device associated with the second user to initiate a synchronous communication session between the first user device and the second user device;

logic executed by the processor for receiving an acceptance of the invitation from the second user device;

logic executed by the processor for receiving a selection of a first one location of the list of locations from the first user device;

logic executed by the processor for creating a synchronous communication session between the first user device and the second user device, where the first user device and the second user device each are caused to display the map, the list of locations and a first chat bubble on the map visually associated with the first one location of the list of locations, the first chat bubble supporting the synchronous exchange of messages between the first user device and the second user device.

25. The computing device of claim 24 additionally comprising:

logic executed by the processor for receiving a selection of a second one location of the list of locations from the second user device; and logic executed by the processor for causing the first user device and the second user device to display the map, the list of locations and a second chat bubble visually associated with the second one location of the list of locations, the chat bubble supporting the synchronous exchange of messages between the first user device and the second user device.

26. The computing device of claim 25 additionally comprising:

logic executed by the processor for receiving via the synchronous communication session, a first plurality of comments from the first user device and the second user device relating to the first one location of the list of locations;

logic executed by the processor for causing each comment of the first plurality of comments to be displayed in the first chat bubble;

logic executed by the processor for receiving via the synchronous communication session, a plurality of comments from the first user device and the second user device relating to the second one location of the list of locations; and logic executed by the processor for causing each comment of the second plurality of comments to be displayed in the second chat bubble.

27. The computing device of claim 26 wherein the first plurality of comments is saved to a database when the second chat bubble is displayed.

28. The computing device of claim 24 additionally comprising:

logic executed by the processor for sending a plurality of third users to join the first user and the second user at the first one location of the list of locations.

29. The computing device of claim 24 wherein the list of locations on the map that relate to the query are retrieved from a database comprising recommendations from local users.

* * * * *